(12) United States Patent
Rathje, Jr.

(10) Patent No.: US 8,943,740 B1
(45) Date of Patent: Feb. 3, 2015

(54) TENSIONLESS HOLDER FOR HOOKS AND LEADERS

(76) Inventor: Marvin E. Rathje, Jr., Murrieta, CA (US)

( * ) Notice: Subject to any disclaimer, the term of this patent is extended or adjusted under 35 U.S.C. 154(b) by 481 days.

(21) Appl. No.: 13/277,166

(22) Filed: Oct. 19, 2011

(51) Int. Cl.
*A01K 97/06* (2006.01)

(52) U.S. Cl.
USPC .................................................. 43/57.2

(58) Field of Classification Search
USPC .............. 43/57.2, 57.1, 54.1; 206/315.11; 224/920
See application file for complete search history.

(56) References Cited

U.S. PATENT DOCUMENTS

| | | | | |
|---|---|---|---|---|
| 595,998 | A * | 12/1897 | Garland | 43/57.2 |
| 920,663 | A | 5/1909 | Schaney | |
| 1,133,542 | A * | 3/1915 | Deal | 43/57.1 |
| 1,451,256 | A | 4/1923 | Gardner | |
| 2,080,794 | A * | 5/1937 | Squassoni | 43/57.2 |
| 2,130,112 | A | 6/1937 | Woolen | |
| 2,188,987 | A * | 2/1940 | Strom | 43/57.1 |
| 2,280,003 | A * | 4/1942 | Pearson | 224/916 |
| 2,447,105 | A * | 8/1948 | Vogel | 43/57.1 |
| 2,465,478 | A * | 3/1949 | Probst | 43/57.1 |
| 2,488,160 | A * | 11/1949 | Behr | 43/57.2 |
| 2,499,042 | A * | 2/1950 | Vogel | 43/57.1 |
| 2,530,292 | A * | 11/1950 | Crook | 43/57.1 |
| 2,553,097 | A * | 5/1951 | Lampe | 43/54.1 |
| 2,595,463 | A * | 5/1952 | Kamps | 43/57.2 |
| 2,597,304 | A * | 5/1952 | Dillingham | 43/57.2 |
| 2,604,721 | A * | 7/1952 | Casciano | 43/57.2 |
| 2,610,430 | A * | 9/1952 | Neiman | 43/57.1 |
| 2,636,309 | A | 4/1953 | Randall | |
| 2,670,564 | A | 3/1954 | Keener | |
| 2,710,482 | A * | 6/1955 | Vogel | 43/57.1 |
| 2,716,302 | A | 8/1955 | Dutton | |
| 2,723,484 | A * | 11/1955 | Nelson, Jr. | 43/54.1 |
| 2,730,833 | A * | 1/1956 | Newell | 43/57.2 |
| 2,743,546 | A * | 5/1956 | Crist | 43/54.1 |
| 2,749,654 | A * | 6/1956 | Harris | 43/57.2 |
| 2,770,064 | A | 11/1956 | Kelley | |
| 2,791,863 | A * | 5/1957 | Sweeney | 43/57.2 |
| 2,826,856 | A * | 3/1958 | Marion et al. | 43/57.2 |
| 2,831,289 | A * | 4/1958 | Klinghoffer | 43/57.1 |
| 2,834,144 | A * | 5/1958 | Jones | 43/54.1 |
| 2,879,619 | A * | 3/1959 | Peterson | 43/57.2 |
| 3,033,487 | A * | 5/1962 | Walker | 43/57.2 |
| 3,122,855 | A * | 3/1964 | Collier | 43/57.2 |
| 3,172,228 | A * | 3/1965 | Freeman | 43/57.1 |
| 3,277,600 | A | 10/1966 | Helfenstein | |

(Continued)

FOREIGN PATENT DOCUMENTS

| | | | | |
|---|---|---|---|---|
| EP | 1044606 A1 | * | 10/2000 | A01K 97/06 |
| EP | 1407663 A1 | * | 4/2004 | A01K 97/06 |

(Continued)

*Primary Examiner* — Darren W Ark
(74) *Attorney, Agent, or Firm* — Palomar Patent; Calif Tervo

(57) ABSTRACT

A holder for storing fish hooks and leaders with the leader in a non-tensioned mode generally comprises a body and a circumferential sleeve sliding on the body. The body includes a plurality of parallel, circumferential grooves including a narrow outer opening for free passage of the leader; and a wider inner portion for retaining the midsection of the leader. A hook and leader may reside in each groove by engaging the hook with the body and by wrapping the hook's leader around the web in the groove by passing the leader through the narrow outer opening so as to reside in the wider inner width of the groove. The sleeve is slidingly attached to said body so as to selectively uncover the grooves for storage or retrieval of a hook and leader.

15 Claims, 1 Drawing Sheet

(56) References Cited

U.S. PATENT DOCUMENTS

| | | | |
|---|---|---|---|
| 3,332,164 A * | 7/1967 | Parrett, Jr. | 43/57.1 |
| 3,507,071 A * | 4/1970 | Bryson | 43/57.1 |
| 3,564,755 A * | 2/1971 | Lindgren, Sr. | 43/57.2 |
| 3,881,273 A | 5/1975 | Herring | |
| 4,006,554 A * | 2/1977 | Tice et al. | 43/57.2 |
| 4,208,825 A * | 6/1980 | Barnes | 43/57.1 |
| 4,238,901 A * | 12/1980 | Martinet et al. | 43/57.1 |
| 4,514,928 A * | 5/1985 | Hanson | 43/57.2 |
| 4,516,707 A * | 5/1985 | Crapanzano | 43/57.1 |
| 4,577,433 A | 3/1986 | Jones | |
| 4,631,856 A * | 12/1986 | Born | 43/57.2 |
| 4,703,581 A * | 11/1987 | Whittier | 43/57.1 |
| 4,825,584 A * | 5/1989 | Raley | 43/57.1 |
| 4,862,635 A * | 9/1989 | Conte | 43/57.1 |
| D307,687 S * | 5/1990 | Raburn | D6/606 |
| D307,688 S * | 5/1990 | Schaefer | D6/606 |
| D307,689 S * | 5/1990 | Schaefer | D6/606 |
| D307,690 S * | 5/1990 | Raburn | D6/606 |
| 4,961,281 A | 10/1990 | Listebarger, Jr. | |
| 5,018,298 A | 5/1991 | Spears | |
| 5,228,232 A * | 7/1993 | Miles | 43/57.1 |
| 5,269,090 A | 12/1993 | Richards et al. | |
| 5,386,662 A | 2/1995 | Vader et al. | |
| 5,517,783 A * | 5/1996 | Edgar | 43/57.1 |
| 5,533,297 A * | 7/1996 | Crosby | 43/57.2 |
| 5,813,528 A * | 9/1998 | Bliek et al. | 43/57.1 |
| 6,009,660 A * | 1/2000 | Rice | 43/57.1 |
| 6,079,148 A * | 6/2000 | Yonenoi | 43/57.2 |
| 6,101,760 A * | 8/2000 | Garman | 43/57.1 |
| 6,219,958 B1 | 4/2001 | Eberts | |
| 6,536,156 B1 * | 3/2003 | Peterson | 43/54.1 |
| 7,168,204 B2 * | 1/2007 | Wieringa et al. | 43/57.1 |
| 7,284,349 B1 * | 10/2007 | Sala | 43/57.2 |
| 7,318,296 B2 * | 1/2008 | Thal | 43/57.2 |
| 7,748,158 B2 * | 7/2010 | Wieringa et al. | 43/57.1 |
| 2004/0074137 A1 * | 4/2004 | Levy | 43/57.2 |
| 2009/0119974 A1 * | 5/2009 | Rieux | 43/57.2 |

FOREIGN PATENT DOCUMENTS

| | | | | |
|---|---|---|---|---|
| FR | 2800241 A1 * | 5/2001 | | A01K 97/06 |
| FR | 2932951 A1 * | 1/2010 | | A01K 97/06 |
| JP | 10084831 A * | 4/1998 | | A01K 97/06 |
| JP | 11-75627 A * | 3/1999 | | A01K 97/06 |
| JP | 11075627 A * | 3/1999 | | A01K 97/06 |
| JP | 2000189025 A * | 7/2000 | | A01K 97/06 |
| JP | 2001128603 A * | 5/2001 | | A01K 97/06 |
| JP | 2001231422 A * | 8/2001 | | A01K 97/06 |
| JP | 2003310126 A * | 11/2003 | | A01K 97/06 |
| JP | 2004113080 A * | 4/2004 | | A01K 97/06 |
| JP | 2005065584 A * | 3/2005 | | A01K 97/06 |
| JP | 2005192560 A * | 7/2005 | | A01K 97/06 |
| JP | 2005211076 A * | 8/2005 | | A01K 97/06 |
| JP | 2006180858 A * | 7/2006 | | A01K 97/06 |
| JP | 2006262812 A * | 10/2006 | | A01K 97/06 |
| JP | 2006320228 A * | 11/2006 | | A01K 97/06 |
| JP | 2008099626 A * | 5/2008 | | A01K 97/06 |
| JP | 2009201508 A * | 9/2009 | | A01K 97/06 |
| JP | 2009240302 A * | 10/2009 | | A01K 97/06 |
| JP | 2010017152 A * | 1/2010 | | A01K 97/06 |
| JP | 2010166864 A * | 8/2010 | | A01K 97/06 |
| JP | 2012152165 A * | 8/2012 | | A01K 97/06 |

* cited by examiner

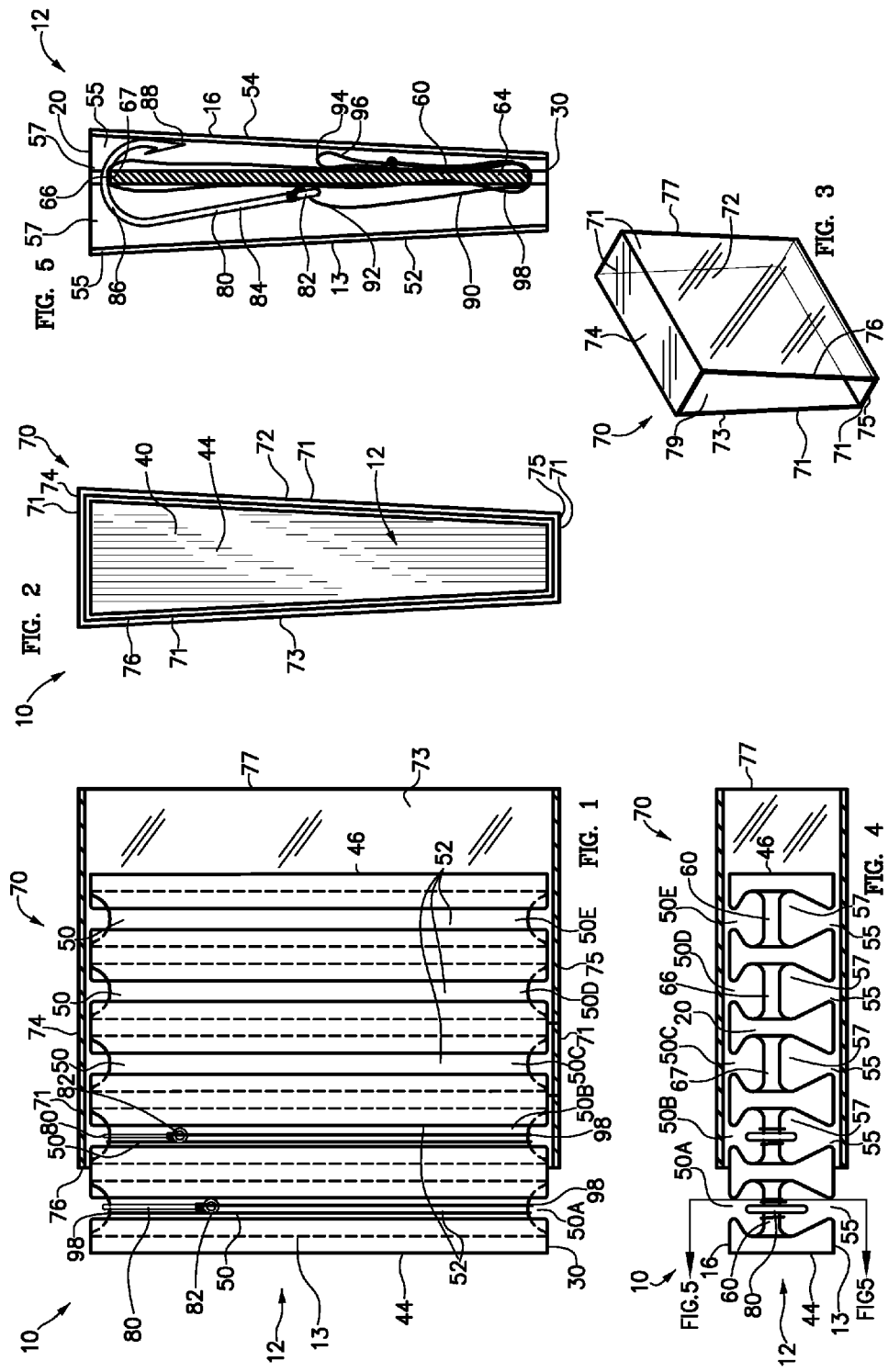

TENSIONLESS HOLDER FOR HOOKS AND LEADERS

FIELD OF THE INVENTION

This invention relates to holders for hooks and leaders wherein the leader is stored in a non-tensioned fashion.

BACKGROUND OF THE INVENTION

While fishing, it is often desirable to have spare hook and leader assemblies readily available. The hook in use may be lost because it is taken by a fish or snag and needs replacement. Or the fisherman wants to use a select or different hook and leader combination.

Modern leaders, such as those intended for spinning, spin cast, or bait casting reels, are almost entirely made from artificial substances, including nylon, polyvinylidene fluoride (PVDF, and called fluorocarbon), polyethylene, Dacron and Dyneema (UHMWPE). The most common type is monofilament, made of a single strand. Fishermen often use monofilament because of its buoyant characteristics, its invisibility, and its ability to stretch under load.

In most conventional hook and leader storage devices, the leader is stored under tension. For very short leaders, this is not a problem. However, for longer leaders, the tensioned leader is wound around a core or corner. A modern leader, wound and under tension, deforms. Thus, when a long tensioned leader is removed from its holder, it will not be the straight as desired, but will be kinked, wavy, spirally or twisted. This deformation of the leader weakens the leader and makes the leader more difficult to handle. It also makes the leader more visible to fish in that it disturbs the water in front of the hook.

Several hook and leader holders have been proposed that store the leader in a non-tensioned condition. However, these have not been commercially successful. One of the reasons for their commercial failure is the inherent resilience of the leader, that is the leader will try to resume its original shape. This makes a freely wound leader unruly as the leader tries to unwind. The freely wound leaders of the prior art do not stay in their intended positions in the holder. As a result, there is a mess of tangled lines in the holder, or leaders protrude from the holder and can catch on other equipment, or the holder cannot be properly closed.

Therefore, there has been the need for hook and leader holder that overcomes the shortcomings of the prior art.

SUMMARY OF THE INVENTION

This invention is a holder for fish hooks and leaders that stores the leader in a relaxed, i.e. non-tensioned mode. The holder generally comprises a body and a circumferential sleeve sliding on the body. The body includes a plurality of parallel, circumferential grooves therein, each groove including a vertical front face portion and a vertical back face portion. The front and back grooves include a narrow outer opening for free passage of the leader; and a wider inner portion for retaining the midsection of the leader. A web separates the front groove from the back groove and has a top end having a hook engaging portion. A hook and leader may reside in each groove by engaging the hook with the top end of each said web, by wrapping the hook's leader around the web in the groove by passing the leader through the narrow outer opening so as to reside in the wider inner width of the groove. The sleeve is slidingly attached to said body so as to selectively cover the grooves.

Other features and many attendant advantages of the invention will become more apparent upon a reading of the following detailed description together with the drawings wherein like reference numerals refer to like parts throughout.

BRIEF DESCRIPTION OF THE DRAWINGS

FIG. 1 is a front elevation view of an exemplary holder including a body and sleeve and showing the sleeve in vertical cross section.

FIG. 2 is left end elevation view of the holder, the right end elevation view being a minor image FIG. 3 is left, top, front side perspective view of the sleeve.

FIG. 4 is a top plan view of the body and sleeve and showing the sleeve in horizontal cross section.

FIG. 5 is a sectional view of the body taken on line 5-5 of FIG. 4.

DETAILED DESCRIPTION OF THE INVENTION

With quick reference first to FIG. 5 of the drawings, there is shown a sectional view of a body 12 of the body 12 of the holder holding an exemplary fishing hook 80 with attached leader 90. Fish hook 80 and leader 90 are of conventional configuration. Hook 80 includes a shank 84, a bend 86, a point 88, and may include an eye 82. Leader 90 has an attached end 92 attached to hook 80 such as to shank 84 or eye 82, a free end 94 that may include a loop 96, and a midsection 98 between attached end 92 and free end 94.

FIG. 1 is a front elevation view of an exemplary holder, denoted generally as 10 including a body, denoted generally as 12, and sleeve, denoted generally as 70, showing the sleeve 70 in vertical cross section, FIG. 2 is an end view of holder 10, FIG. 3 is left, top, right side perspective view of sleeve 70, FIG. 4 is a top plan view of body 12 and sleeve 70 showing sleeve 70 in horizontal cross section, and FIG. 5 is a sectional view of body 12 taken on line 5-5 of FIG. 4.

Body 12 includes a front face 13, a back face 16, a top 20, a bottom 30 and ends 40 including left end 44 and right end 46. Body 12 can be made of any suitable material, such as plastic or wood.

Body 12 includes a plurality of parallel, circumferential grooves 50, such as grooves 50A-50E therein. Although five grooves 50 are shown, any desired number could be used. As best seen in FIG. 4, each groove 50 includes a vertical front face portion 52 and a vertical back face portion 54 separated by a web 60. Web 60 includes a bottom end 64 and a top end 66. Web 60, such as top end 66, includes an engaging portion 67 adapted for engaging hook 80 and retaining hook 80 while leader 90 is wound in groove 50 around body 12. Preferably, the use of engaging portion 67 does not involve deformation of body 12, such as sticking point 88 into body 12, so that hook 80 is readily disengaged.

Returning to FIG. 5, in the exemplary embodiment shown, the engaging portion 67 of top end 66 of web 60 includes having a thickness adapted to fit within bend 86 of hook 80 such that hook 80 can be hung over engaging portion 67 of web 60 and leader 90 wound in groove 50 around body 12. Each front face portion 52 and back face portion 54 of each groove 50 has a narrow outer opening 55 and a wider inner portion 57. Preferably, outer opening 55 is just wide enough for free wrapping passage of leader 90 or, at the widest, just wide enough to allow for passage of eye 82 of hook 80. Typically, leader 90 has a slight curl or waviness such than a leader 90 wound in groove 50 curls or waves in wider inner portion 57 of groove 50 so as to have a width wider than narrow outer opening 55 such that leader 90 does not readily fall out narrow outer opening 55.

As seen in FIG. 5, a typical hook 80 engages web 60 such that hook 80 on the side of shank 84 is further from web 60 than is hook 80 on the side of point 88. Preferably, front face portion 52 of groove 50 is deeper than back face portion 54 so as to accommodate shank 84 side of hook 80. Also, grooves 50 may be shallower away from hooks 80 and near bottom 30 of body 12 such that body 12 may be tapered as shown. Tapered body 12 allows holder 10 to be more easily inserted in a user's pocket and visually and tactilely indicates which side is top 20.

Circumferential sleeve 70 is slidingly attached to body 12 so as to selectively cover and uncover grooves 50 for storing and retrieving hooks 80 and leaders 90. Sleeve 70 includes walls 71, including front wall 72, back wall 73, top wall 74, and bottom wall 75, surrounding a central cavity 79 for receiving body 12. Sleeve 70 includes a left edge 76 and a right edge 77. Preferably, sleeve 70 is adapted, such as by having cut outs or by being transparent, for readily showing the number and positioning of stored hooks 80 and leaders 90. Sleeve 70 may be made out of any suitable material such as clear plastic.

One or more types of hook/leader combinations can be stored in holder 10. In a typical use, a user would store two types of hook/leader combinations; for example, a first type in grooves 50A-C and a second type in grooves 50D and 50E. To do this, sleeve 70 is slid to the right to expose groove 50 C and a hook 80 and leader 90 is stored in groove 50. Sleeve 70 is slid to the left to cover groove 50C and a hook 80 and leader 90 is stored in groove 50B. This is repeated for groove 50A. Groove 50D is next filled by sliding sleeve 70 to the left such that right edge 77 of sleeve 70 is to the left of groove 50D and a hook 80 and leader 90 combination is inserted. Sleeve 70 is slid to the right to cover groove 50D and a hook 80 and leader 90 are stored in groove 50E. Sleeve 70 is slid to the right to cover all grooves 50. The hook 80 and leaders 90 are retrieved from the ends toward the middle in similar fashion. Groove 50 is adapted at one or more positions to allow the user access, such as finger access, to the stored hook 80 and leader 90 for removing it from holder 10. In the exemplary embodiment shown, hook 80 and leader 90 readily are accessed by a user's fingers at the top end 66 or bottom end 64 of web 60. A finger accessible opening elsewhere in groove 50 would allow the user to remove hook 80 and leader 90.

FIGS. 1 and 4 show body 12 with hooks 80 and leaders 90 in grooves 50A and 50B. Sleeve 70 is slid to the right such that sleeve front edge 76 is to the right of groove 50A to provide access to grove 50A such that hook 80 and leader 90 may be stored or retrieved.

Having described the invention, it can be seen that it provides a very convenient holder for convenient access to a variety of hook and leader combination without putting kinks in leaders from tensioning.

Although a particular embodiment of the invention has been illustrated and described, various changes may be made in the form, composition, construction, and arrangement of the parts herein without sacrificing any of its advantages. Therefore, it is to be understood that all matter herein is to be interpreted as illustrative and not in any limiting sense, and it is intended to cover in the appended claims such modifications as come within the true spirit and scope of the invention

I claim:

1. A holder for a plurality of hooks with leaders, each hook including a shank, a bend, and a point; each of the hooks having a leader with an attached end attached to the hook, a free end, and a midsection therebetween; said holder comprising:
   a body including:
      an elongate front face;
      an elongate back face;
      a top;
      a bottom;
      a left end;
      a right end;
      a plurality of parallel, circumferential grooves therein including a left groove and a right groove; each of the grooves including:
         a top portion in said top;
         a bottom portion in said bottom;
         an elongate front face portion in the front face; and
         an elongate back face portion in said back face; and
      a web separating said front face of each said groove and said back face portion of each said groove; said web having a bottom end near said bottom and a top end near said top including a hook engaging portion, said elongate front and back face portions of said grooves including:
         an outer opening for free passage of the leader during winding of the leader about said web and for free exit of the leader during unwinding of the leader from said web; and
         an inner portion that is wider than said outer opening such that the intersection of an untensioned leader therein can assume a lengthwise wavy configuration that is wider than said outer opening so as to be retained in said groove; and
   a circumferential sleeve slidingly attached to said body so as to selectively cover said grooves.

2. The holder of claim 1 wherein:
said web is adapted for engaging the bend of a hook.

3. The holder of claim 1 wherein:
said front face portion of each said groove is deeper than said hack face portion of each said groove.

4. The holder of claim 1 further including:
said circumferential sleeve for said body including:
   a front wall over said front face of said body;
   a back wall over said back face of said body;
   a top wall over said top of said body;
   a bottom wall over said bottom of said body;
   an open left side; and
   an open right side; said sleeve slidingly attached to said body for selectively covering said grooves for aiding retaining said plurality of hooks with leaders therein and for selectively uncovering each said groove for insertion therein or removal therefrom of one of the plurality of hooks with leaders; said sleeve slidable to the right to uncover said left groove while covering said right groove and slidable to the left to uncover said right groove while covering said left groove.

5. The holder of claim 4 wherein:
said sleeve is sufficiently transparent to show hooks and leaders stored in said grooves.

6. In combination:
a plurality of hooks with leaders, each hook including a shank, a bend, and a point; each of the hooks having a leader with an attached end attached to the hook, a free end, and a midsection therebetween; and
a holder for said hooks with leaders; said holder comprising:
   a body including:
      an elongate front face;

an elongate back face;
a top;
a bottom;
a left end;
a right end;
a plurality of parallel, circumferential grooves therein including a left groove and a right groove, each of the grooves including:
  a top portion in said top;
  a bottom portion in said bottom;
  an elongate front face portion in said front face; and
  an elongate back face portion in said back face; and
a web separating said front face portion of each said groove and said back face portion of each said groove; said web having a bottom end near said bottom and a top end near said top including a hook engaging portion; said front and back face portions of each of said grooves including:
  an outer opening for free passage of the leader during winding of the leader about said web and for free exit of the leader during unwinding of the leader from said web; and
  an inner portion that is wider than said outer opening such that the midsection of an untensioned leader therein can assume a lengthwise wavy configuration that is wider than said outer opening so as to be retained in said grooves; and
a circumferential sleeve slidingly attached to said body so as to selectively cover said grooves.

7. The combination of claim 6, said holder further including:
said circumferential sleeve for said body including:
  a front wall over said front face of said body;
  a back wall over said back face of said body;
  a top wall over said top of said body;
  a bottom wall over said bottom of said body;
  an open left side; and
  an open right side; said sleeve slidingly attached to said body for selectively covering said grooves for aiding in retaining said hooks with leaders therein and for selectively uncovering each said groove for insertion therein or removal therefrom of one of said hooks with leaders; said sleeve slidable to the right to uncover said left groove while covering said right groove and slidable to the left to uncover said right groove while covering said left groove.

8. The combination of claim 7 wherein:
said sleeve is sufficiently transparent to show said hooks with leaders stored in said grooves.

9. The combination of claim 6 wherein:
said web is adapted for engaging the bend of a hook.

10. The combination of claim 6 wherein;
said front face portion of each said groove is deeper than said back face portion of each said groove.

11. A method of storing and retrieving hooks with untensioned leaders, said method comprising:
providing a plurality hooks with leaders, each hook including a shank, a bend, and a point; each of the hooks having a leader with an attached end attached to the hook, a free end, and a midsection therebetween;
providing a holder for the plurality of hooks with leaders; the holder comprising: a body including: an elongate front face; an elongate back face; a top; a bottom; a left end; a right end; a plurality of parallel, circumferential grooves therein including a left groove and a right groove, each of the grooves including: a top portion in the top; a bottom portion in the bottom; an elongate front face portion in the front face; and an elongate back face portion in the back face; and a web separating the front face portion of each of the grooves and the back face portion of each of the grooves; the web having a bottom end near the bottom and a top end near the top including a hook engaging portion; the front and back face portions of each of the grooves including: an outer opening for free passage of the leader during windings of the leader about the web and for free exit of the leader during unwinding of the leader from the web; and an inner portion that is wider than the outer opening such that the midsection of an untensioned leader therein can assume a lengthwise wavy configuration that is wider than the outer opening so as to be retained in the grooves;
providing a circumferential sleeve slidingly attached to said body so as to selectively cover said grooves; and
storing a provided one of the plurality of hooks with leaders in each of the grooves by engaging the hook with the top end of the web of each of the grooves and wrapping the leader around the web by passing the leader through the outer opening so as to reside non-tensioned in the inner portion of each of the grooves.

12. The method of claim 11 further including:
said circumferential sleeve for the body including: a front wall over the front face of the body; a back wall over the back face of the body; a top wall over the top of the body; a bottom wall over the bottom of the body; an open left side; and an open right side; the sleeve slidingly attached to the body for selectively covering the grooves for aiding in retaining the plurality of hooks with leaders therein and for selectively uncovering each of the grooves for insertion therein or removal therefrom of one of the plurality of hooks with leaders; the sleeve slidable to the right to uncover the left groove while covering the right groove and slidable to the left to uncover the right groove while covering the left groove.

13. The method of claim 12 wherein:
the provided sleeve is sufficiently transparent to show the plurality of hooks with leaders stored in the grooves.

14. The method of claim 11 wherein:
the web is adapted for engaging the bend of a hook.

15. The method of claim 11 wherein:
the front face portion of each of the grooves is deeper than the back face portion of each of the grooves.

* * * * *